(12) United States Patent
Barnes et al.

(10) Patent No.: US 6,955,288 B2
(45) Date of Patent: Oct. 18, 2005

(54) METALLURGICALLY BONDED LAYERED ARTICLE HAVING A CURVED SURFACE

(75) Inventors: John James Barnes, Hockessin, DE (US); Joseph Gerard Biondo, Martinville, NJ (US); Peter Gideon Gelblum, Philadelphia, PA (US); Richard Delbert Lanam, Westfield, NJ (US); Charles Joseph Noelke, Wilmington, DE (US); David Archer Wells, Newark, DE (US)

(73) Assignees: E. I. du Pont de Nemours and Company, Wilmington, DE (US); Engelhard-CLAL, Carteret, NJ (US)

( * ) Notice: Subject to any disclaimer, the term of this patent is extended or adjusted under 35 U.S.C. 154(b) by 210 days.

(21) Appl. No.: 10/659,893

(22) Filed: Sep. 11, 2003

(65) Prior Publication Data

US 2004/0046004 A1 Mar. 11, 2004

Related U.S. Application Data

(62) Division of application No. 09/773,204, filed on Jan. 31, 2001, now abandoned.

(51) Int. Cl.[7] .............................................. B21D 39/04
(52) U.S. Cl. ..................... 228/173.4; 228/184; 228/193
(58) Field of Search ........................... 228/173.2, 173.4, 228/182, 183, 184, 193, 131; 428/670, 672, 673, 680, 610; 138/142, 143; 72/347, 700; 29/523

(56) References Cited

U.S. PATENT DOCUMENTS

| | | | |
|---|---|---|---|
| 2,506,326 A | * | 5/1950 | Adams ....................... 378/121 |
| 3,156,976 A | | 11/1964 | Whiting |
| 3,672,036 A | * | 6/1972 | Ziemianski .................. 228/208 |
| 4,010,965 A | * | 3/1977 | Izuma et al. ................. 428/651 |
| 4,190,957 A | * | 3/1980 | Hasegawa et al. ............. 30/411 |
| 4,533,806 A | | 8/1985 | Kawasaki et al. |
| 4,795,078 A | * | 1/1989 | Kuroki et al. ............... 228/131 |
| 4,962,007 A | | 10/1990 | Phelan |
| 5,025,975 A | | 6/1991 | Oakes et al. |
| 5,485,736 A | * | 1/1996 | Collier et al. ................... 72/47 |
| 5,858,556 A | | 1/1999 | Eckert et al. |
| 5,940,951 A | * | 8/1999 | Schulz et al. .............. 29/421.1 |

FOREIGN PATENT DOCUMENTS

| | | |
|---|---|---|
| JP | 63183717 | 7/1988 |
| JP | 05258626 | 10/1993 |
| WO | 00/54704 | 9/2000 |

OTHER PUBLICATIONS

Smithell's Metals Reference Book, E.. A. Brandes, G. B. Brook, and C. J. Smithell, Butterwork–Heinemann, Boston, MA (1998), p. 13–1.

American Society for Materials Handbook vol. 17: Nondestructive Evaluation and Quality Control, ASM, Metals Park, OH, p. 231, no date avail.

Structure and Properties Alloys, R. M. Brick, R. B. Gordon, and A. Phillips, McGraw–Hill (1965), p. 84.

ACTA Metallurgica, vol. 11, Jan. 1963, Diffusion of Iron, Cobalt and Nickel in Gold, David Duhl, Ken–Ichi Hirano and Morris Cohen.

Gold Bulletin, vol. 10, No. 2, (Apr. 2, 1977) pp. 34–37, Explosive Cladding with Gold, Gisela Bechtold and Immanuel Michael.

* cited by examiner

*Primary Examiner*—Jonathan Johnson

(57) ABSTRACT

A layered article having a curved surface made of a supporting metal metallurgically bonded to a supported metal.

28 Claims, 2 Drawing Sheets

METALLURGICALLY BONDED LAYERED ARTICLE HAVING A CURVED SURFACE

This is a Divisional of application Ser. No. 09/773,204, filed Jan. 31, 2001, now abandoned.

FIELD OF THE INVENTION

This invention is in the field of shaped layered articles of similar or dissimilar metals.

BACKGROUND OF THE INVENTION

Multilayer, particularly bilayer, metal articles are used where no single metal meets the physical, chemical, or economic requirements of an application. Examples of such articles are containers that must be corrosion resistant or chemically inert, such as tubes for heat exchangers in corrosive service. Metals meeting these requirements, such as copper, gold, or platinum may lack the strength or be too expensive to be used alone. Combining these metals with a layer of stronger or less expensive metal such as steel is a way of providing strength or reducing cost. Various methods of joining such layers have been developed. Their suitability depends upon the use to which the article will be put. Extended high temperature use is especially severe in its demands on interlayer bonds.

Among the methods for combining metal layers, one of the more general is the use of loose liners, that is linings or inserts that are not bonded to the substrate metal. However, the absence of interlayer bonding adversely affects the efficiency of heat transfer through the layers of the article. Thus, loose liners are unsuitable for applications that require good heat transfer between the metal layers. Furthermore, because the loose liner is not bonded to the substrate metal, it is not supported against collapse, which may occur, particularly at high temperature or high flow conditions.

Where bonding between layers is desired, various ways of bonding are available. One such way is adhesive bonding using organic or inorganic adhesives. Such bonding techniques are limited by the temperature tolerance of the adhesive. In addition, the adhesive layer generally has poorer thermal conductivity than the metal layers it joins, and it thereby interferes with heat transfer through the joined layers.

Explosive cladding (Gold Bulletin, vol. 10, no. 2, pp. 34–37, Apr. 2, 1977) gives metal to metal bonding. In this method, an explosive is coated on one of the metal layers. On detonation, the explosive force drives the coated metal layer against the second metal layer and bonding is achieved. However, the bond is not always uniform in strength or coverage because the shock wave characteristic of explosions causes a variation in the impact pressure on the metals. For the same reason, the bonded interface may have a waviness and therefore a nonuniform thickness in the metal layer. Another drawback of this method is that the blast force can cause work hardening of the metal, which is not always desirable. Furthermore, explosive cladding is unsuitable when one of the metals lacks the strength to withstand the explosive force necessary to get an acceptable bond between the layers. Also, by its nature, this method imposes safety requirements in its application, and can be difficult to control.

Making bonded layered metal articles by rolling or pressing the layers together is known, but is suitable only for flat articles such as sheets. For articles that are not flat, rolling is often not possible, and pressing can be done only with tools that match the shape of the article, that is, dies. For larger articles and where a variety of sizes and lengths are to be made, this can be prohibitively expensive.

Electroplating is practical for the application of thin layers only, and not all metals can be electroplated. Weld overlay is limited to articles of shapes and sizes that permit access of the welding equipment. Coextrusion can be used only with metals for which the rheological properties are closely matched at the extrusion temperature. This need for matching rheological properties limits the combinations of materials that can be coextruded. Gas pressure bonding or hot isostatic pressing is used to bond metals. It is done in an autoclave, and temperatures of 1100–1700° C., pressures of 10,000–15,000 psi (70–100 MPa) are typical. This method is not well suited to applying a liner to the inner surface of a vessel or tube.

There is a need for non-flat uniformly metallurgically bonded layered articles of metals having dissimilar properties, and for a process for making such articles.

SUMMARY OF THE INVENTION

An object of the present invention is to provide metallurgically bonded layered articles, that are corrosion resistant on at least one surface, such as tubing for a heat exchanger in corrosive service.

This invention provides a layered article having a curved surface comprising a non-planar layer of a supporting metal and a non-planar layer of wrought supported metal wherein the layers of supporting and supported metals are metallurgically bonded over an interfacial region that has substantially complete bonding, and the interfacial region consists essentially of the supporting and the supported metals. The supported metal or supported layer is also called the applied metal or the applied layer.

Another embodiment of the present invention is directed to a tube comprised of an outer layer of a supporting metal and an inner layer of a wrought supported metal wherein said layers of supporting and supported metals are metallurgically bonded over an interfacial region that has substantially complete bonding, and said interfacial region consists essentially of said supporting and said supported metals.

A further embodiment of the present invention relates to a process for making a layered article having a curved surface, comprising: providing a non-planar layer of a wrought supported metal; providing a nonplanar layer of a supporting metal; finishing mating surfaces of said supported and supporting metal layers; aligning the finished mating surfaces of the supported and supporting metal layers; expanding the supported layer mechanically against the supporting layer; expanding the supported layer against the supporting layer by applying hydraulic pressure to the supported layer; applying pneumatic pressure to the supported layer and heating the article to no more than 98% of the absolute melting point of the lower melting metal for up to several days; and cooling the article.

A further embodiment of the present invention relates to a process for making a tube comprising: providing a tubular outer layer of a supporting metal, and a tubular inner layer of a wrought supported metal; finishing an outer mating surface of the inner layer and an inner mating surface of the outer layer; inserting the inner layer into the outer layer; expanding the inner layer mechanically against the outer layer; expanding the inner layer against the outer layer by applying hydraulic pressure; applying pneumatic pressure to the inner layer and heating the article to no more than 98% of the absolute melting point of the lower melting metal for up to several days; and cooling the article.

DETAILED DESCRIPTION

Figure 1:
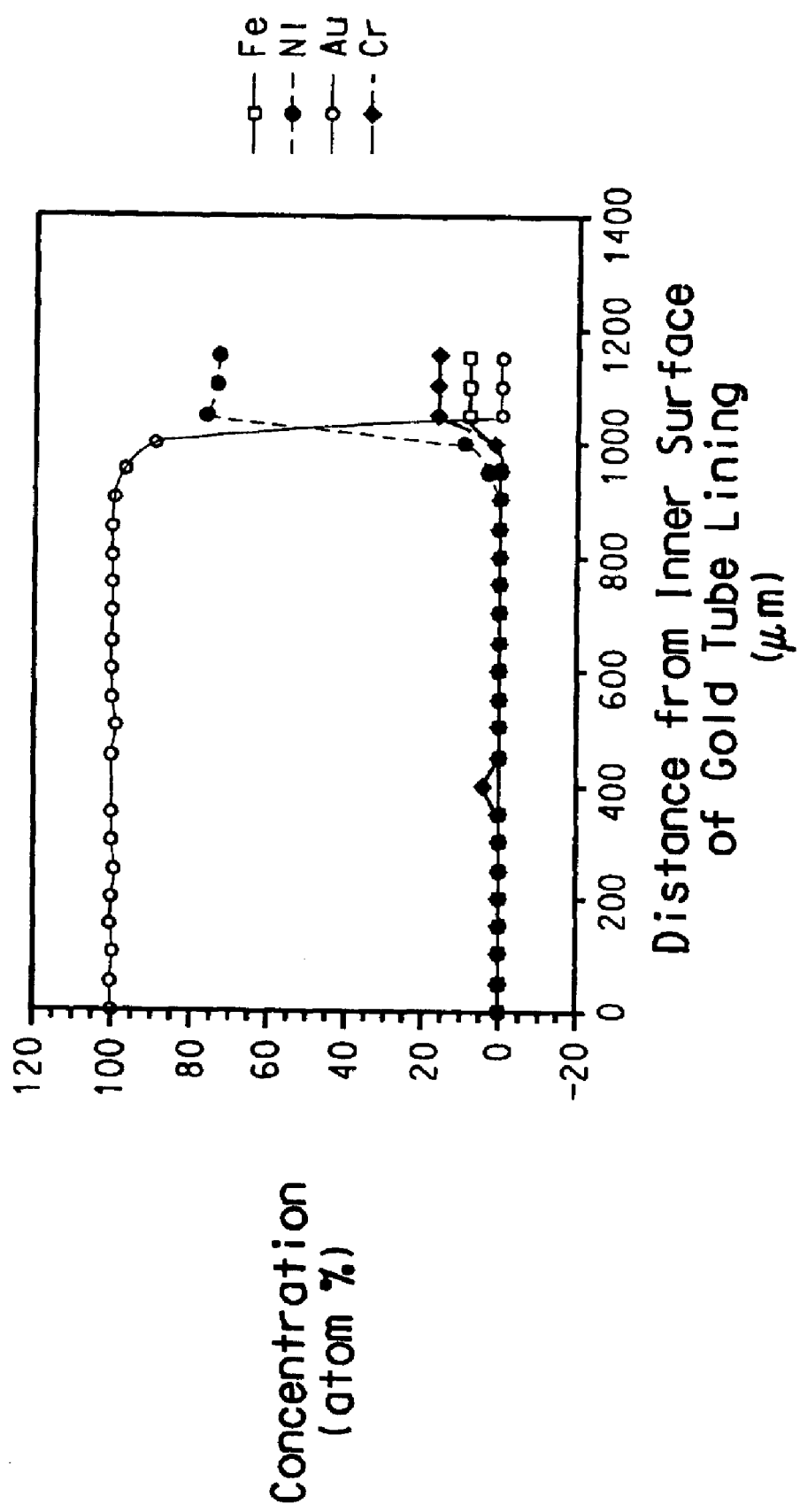
FIG. 1 is a plot of the elemental profile of a cross-section of a gold-lined Inconel® tube, said tube being made according to the present invention.

This invention provides a layered article having a curved surface comprising a non-planar layer of a supporting metal and a nonplanar layer of wrought supported metal wherein the layers of supporting and supported metals are metallurgically bonded over an interfacial region that has substantially complete bonding, and the interfacial region consists essentially of the supporting and the supported metals. The supported metal or supported layer is also called the applied metal or the applied layer.

In one embodiment, the invention is directed to a tube comprised of an outer layer of a first metal, and an inner layer, also called a lining, of a second metal. One of the layers must be, and both may be, wrought metal. In a preferred embodiment, the layered article is a tube in which the inner layer or lining is a metal selected from the group consisting of platinum, palladium, gold, silver, copper, rhodium, and iridium, and alloys containing at least one of these metals, and the outer layer is a metal is selected from the group consisting of iron, nickel, copper, and alloys containing at least one of these metals.

"Metal" as used herein includes the elemental metals that are solid at room temperature, such as steel, stainless steel, nickel-copper alloys (such as the Monel® range of alloys), or iron-base alloys (such as the Incoloy® range of alloys) or nickel-base alloys (such as the Inconel® or Haynes® or Hastelloy® range of alloys), or bronze, brass, etc. An extensive list of metals can be found in *The Metals Handbook® Desk Edition*, H. E. Boyer and T. L. Gall, Eds., American Society for Materials, Metals Park, Ohio, 1985. The layered metal articles made according to this invention can have layers in which the metals are of the same chemical composition. This would be the case for example, if a wrought supported layer were bonded to a cast supporting layer of the same chemical composition.

The supported layer is always of wrought metal, and is generally the less strong or more costly of the two layers in a bilayer metal article. Preferred metals for the supported layer include those which resist oxidation or chemical attack, such as platinum, gold, palladium, silver, rhodium, iridium, and alloys containing at least one of these metals. If more than one layer of metal is applied to make a multilayer article according to this invention, then each applied layer is a supported layer. The supporting metal layer may be wrought but this is not necessary.

The term "wrought" refers to metal which has been shaped by hot or cold plastic deformation such as rolling and forging, usually from a cast state. The effect of deformation is to break up the coarse-grained, dendritic structure of a casting to produce a more homogeneous, fine-grained structure. Some of the methods used shape metals as described in "Manufacturing Processes for Engineering Materials", Serope Kalpakjian, Addison-Wesley, Reading, Mass. (1985). The supported layer is considered to be wrought for the purposes of this invention if the greater part of the mass of the supported layer is wrought, preferably greater than 80% wrought, more preferably greater than 90% wrought, most preferably greater than 95% wrought.

Preferred supporting metals include iron, nickel, and copper, and alloys containing at least one of these metals, such as steel, stainless steel, nickel-copper alloys (such as the Monel® range of alloys), iron-base alloys (such as the Incoloy® range of alloys), nickel-base alloys (such as the Inconel® or Haynes® or Hastelloy® range of alloys), or bronze, brass, etc. The method of forming the supported metal depends upon the final form or shape of the supported metal piece. Plate can be cast or wrought, sheet would be wrought, tube or pipe can be centrifugally cast, or can be drawn, in which case the metal is wrought. More intricate forms can be forged, in which case the metal is wrought.

The invention also provides a process for making the above article. The supported and supporting layers are shaped so that their mating surfaces, that is, the surfaces that are to be bonded, are as nearly as possible the same shape and size, so as to minimize the work necessary to obtain intimate contact and a substantially complete bond between the mating surfaces.

The surface of the supporting layer is finished by honing, preferably to a surface roughness of at least about RMS 8, measured in accordance with ANSI/ASME B46.1–1985, and then cleaning the surface, such as by degreasing, pickling, and the like. If the supporting metal is susceptible to oxidation or corrosion in the course of the fabrication of the layered article, steps must be taken to prevent oxidation. Oxidation can interfere with the bond, making it less strong, or incomplete. One way to prevent oxygen from contacting the metal surfaces which are to be bonded is by applying a thin protective coating of a metal that is resistant to oxidation, such as gold, silver, or others well-known in the art. This protective coating, also known as a flash or a strike, may be applied by electroplating or by electroless coating, or by other means. Its thickness is typically about 0.1 $\mu$m. Another way to prevent oxidation is to evacuate the interlayer region so that oxidation will not occur in the course of heating. However, since complete evacuation may not be possible, particularly in the case of large articles, it is preferred to apply a protective coating of metal resistant to oxidation.

The supported layer is similarly cleaned, and if necessary, given a protective coating. If either the supported or supporting layer is made of an oxidation resistant metal, it is preferable that any protective coating on the other layer be of the same oxidation resistant metal, if possible, for better bonding between the supported and supporting layers. If both layers must be given a protective coating, it is preferable that the same oxidation resistant metal be used for both to promote better bonding between the supported and supporting layers.

If the protective coating is applied to the supported layer, which as stated above must be a wrought metal, it is not necessary that the protective coating be wrought.

After the above-described preparation of the surfaces, the supported and supporting layers are bonded as follows.

The mating surfaces of the supported metal and the supporting metal are brought into alignment. In the case in which the supporting layer is a tube which is to be lined, the supported layer is also a tube, the outer diameter of which is only slightly smaller than the inner diameter of the supporting tube. The difference in these diameters will be no greater than needed to allow the inner tube to be inserted into the outer tube without binding.

The supported layer is first mechanically pressed against the supporting layer. In the case in which the supported layer is a liner in a tube of supporting metal, the liner is mechanically pressed against the wall of the supporting tube, for example by drawing a mandrel through the supported tube layer.

At this point, the interlayer region may optionally be evacuated to remove entrapped gases, especially air. If evacuation is to be used to prevent oxidation during the subsequent heating step, vacuum is applied to one or more holes made through one or the other of the layers to reach the interface between the layers to evacuate any gas that remains between the mating surfaces. After evacuation, the holes are sealed.

Then the supported layer is hydraulically pressed against the supporting layer. If the supported layer is on the interior surface of the article, the article may be filled with a liquid, such as water, and pressure is applied to bring the mating surfaces into more intimate contact. The magnitude of the pressure applied depends on the yield strength of the supported layer and of the supporting layer. The pressure should be sufficient to cause the supported layer to yield and move into closer contact with the supporting layer. Therefore the pressure should exceed the yield strength of the metal of which the supported layer is comprised. The yield strengths of many metals and alloys are given in *The Metals Handbook® Desk Edition*, H. E. Boyer and T. L. Gall, Eds., American Society for Materials, Metals Park, Ohio, 1985. The measurement of yield strength is made according to ASTM method E8–99. The applied pressure may exceed the yield strength of the supporting layer if that layer can be supported mechanically or by counterpressure during the hydraulic pressing step. If the supported layer is on the exterior surface of the article, pressure is applied to the exterior surface by means determined by the geometry of the article. For example, if the article is spherical and the supported layer is on the surface of the sphere, the sphere is immersed in the liquid to which pressure is then applied. When hydraulic pressing is finished, the hydraulic liquid is removed and the article dried.

Then, moderate inert gas pressure is applied to the supported layer and the article is heated to complete the bonding. The temperature of heating is sufficient to cause the formation of a metallurgical bond between the supported and supporting metals. Herein, a "metallurgical bond" means a bond in which atoms of the metals in the supported and supporting layers interdiffuse, that is, diffuse among each other. Sufficient pressure and heat are applied for a sufficient time to cause diffusion bonding or metallurgical bonding. Pressure is applied by pressurizing the supported layer pneumatically with an inert gas, such as argon. The pressure applied is no more than is necessary to hold the supported layer firmly against the supporting layer while the metallurgical bond is being formed. A pressure of 700–3000 kPa is normally adequate, preferably 1500–2500 kPa. This is lower than is used in gas-pressure bonding.

Metallurgical bonding in this step is due primarily to the temperature applied, with pressure having only a secondary influence. The temperature depends upon the metals but is lower than would be used in hot isostatic pressing. The temperature can approach the absolute melting point of the lower melting metal. How close the temperature can be to the absolute melting point of the lower melting metal is determined by the precision and accuracy of temperature control of the heating apparatus, and the tendency of the lower melting metal to sag or creep, which in turn will be affected by the shape of the article. However, in most circumstances it should be possible to heat to within 98% of the absolute melting point of the lower melting metal. Preferably the temperature during heating should be 50–95% of the absolute melting point of the lower melting metal. This heating is continued for up to several days, preferably for 1 to 24 hours, more preferably for 5 to 15 hours, most preferably 8 to 12 hours. Secondarily, the temperature should be such that substantial interdiffusion can occur in a reasonable period of time. This can be estimated from diffusivities that are available in the literature (e.g. *Smithell's Metals Reference Book*, E. A. Brandes, G. B. Brook, and C. J. Smithell, Butterworth-Heinemann, Boston, Mass. (1998), p. 13–1).

Surprisingly, it is found that if either the application of mechanical force or the application of hydrostatic pressure is omitted, the quality of the metallurgical bond between the layers is reduced.

The process may be repeated if the finished article requires the application of one or more additional layers of the same or of another supported metal. The resulting article comprises a supported layer and a supporting layer metallurgically bonded together. At the interface between the supported and supporting layers there is a region where the metals are interdiffused, which is called the interfacial region. When different metals are bonded, the interfacial region comprises an alloy of the metals making up the two layers. This alloy is formed by interdiffusion of the metals during the metallurgical bonding step. In the case where chemically identical metals are bonded, the interfacial region is made up of atoms from both supported and supporting layers. There must be some interdiffusion to achieve a metallurgical bond. Complete interdiffusion is not desirable because this defeats the purpose of layering the supporting metal on the supported metal. The thickness of the interfacial region should therefore be less than the thickness of the supported or supporting layers. An interfacial region of several micrometers thickness is adequate. The interfacial region is determined from measurements on a cross section of the layered article. The "100-zero" thickness is the distance from the point at which the metal composition first ceases to be solely that of the supported layer, to the point at which the metal composition becomes solely that of the supporting layer, as measured by a technique such as energy dispersive spectroscopy (ECD). It is sometimes easier to measure the "90–10" thickness, which is the distance from the point at which at least one of the components of the supported layer has declined to 90% of its concentration in the material that makes up the supported layer, to the point at which that same component has declined to 10% of that concentration.

The thickness of the interfacial region, here defined as the "90–10" thickness, should preferably be less than 150% of the original thickness of the supported layer, more preferably less than 50% of the original thickness of the supported layer, and most preferably less than 25% of the original thickness of the supported layer.

By "substantially complete bonding over the interfacial region" is meant that at least 80% of the interface area is bonded, preferably 90%, more preferably 95%, and most preferably, 100%.

If an oxidation resistant coating has been applied to either or both of the finished surfaces of the supported and supporting layers, the interfacial region consists essentially of an alloy of the metals making up the supported and supporting layers. If the supported and/or supporting layers have oxidation resistant coatings at the contacting surfaces of the layers, the resultant interfacial region nevertheless consists essentially of an alloy of the metals making up the supported and supporting layers because of the small thickness of the oxidation resistant coatings.

If a second supported layer is to be applied, the above steps are repeated.

EXAMPLES

The roughness of the mating surfaces of the supported and supporting layers is measured as described in the American Society of Mechanical Engineers (ASME) designation ASME B46.1–1995 and is reported as an "RMS" number. The presence of a bond between the layers is determined by ultrasonic testing (UT). This technique uses the transmission of sound waves to determine if a bond is present. If a bond is present sound waves are transmitted through the layered article and the thickness of the layered article is measured. If there is no bonding, sound waves transmit only through the supporting metal portion and only that thickness is measured according to the method given in American Society for Materials Handbook, Volume 17: Nondestructive Evaluation and Quality Control, ASM, Metals Park, Ohio, p. 231. The thickness of the region of interdiffusion of the metals of the supported and supporting layers is measured by scanning electron microscopy and by Electron Dispersive Analysis of X-ray (EDAX) profiles of the elements concerned. Bonds that are at least 10 µm thick and contain at least 10 atomic % of the diffusing element are considered metallurgical for the purposes of this invention. The bond is also inspected by metallographic examination, that is, by high magnification optical microscopic or scanning electron microscopic examination of cross sections cut from the bonded article. The micrographs will plainly reveal the presence of gaps between the supported and supporting metals and the presence of oxide layers or other interfering layers at the interface of the metals.

The estimation of the time and temperature necessary to form a metallurgical bond is shown here for the case of gold and nickel. The mean penetration distance, x, that is the distance over which an appreciable amount of diffusion occurs, can be estimated from the approximate solution to Fick's law of diffusion (Structure and Properties of Alloys, R. M. Brick, R. B. Gordon, and A. Phillips, McGraw-Hill (1965), p. 84):

$$x^2 = D \cdot t \qquad (1)$$

where D is the diffusivity in cm²/sec and t is time in seconds. D can be estimated from equation 2:

$$D = A \cdot \exp(-Q/RT) \qquad (2)$$

Where A is 0.034±0.007 cm²/sec and Q is 42.0±0.4 kcal/mole, R is the gas constant and T is the absolute temperature. The values for A and Q are obtained from D. N. Kuhl, K. Hirano, and M. Cohen: Acta Met., 11, 1 (1963). At 850° C. (1123° K.), the value of D from equation 2 is $2.3 \cdot 10^{-10}$ cm²/sec. Using this value of D in Equation 1, it is found that in 10 hours at 850° C. the thickness of the region of appreciable diffusion mentioned above is about 30 µm. This agrees well with the 50 µm thickness of the 90:10 to 10:90 region described in Example 1, below.

Example 1

This example describes the production of a tube of Inconel® 600 alloy with a lining of gold according to a preferred embodiment of this invention. The Inconel® tube is the supporting layer. The gold lining is the supported layer. The Inconel® tube has an outer diameter of 26.7 mm and an inner diameter of 20.9 mm and is less than one meter long. The gold lining is a wrought tube of the same length, having an outer diameter of 20.50 mm and an inner diameter of 18.50 mm. The inner surface of the Inconel® tube is honed to a finish of RMS 8 and cleaned by first degreasing with hot Oakite #3 soap solution. This is followed by acid pickling using a solution of sulfuric acid and hydrochloric acid (mixed in proportions of 7.9% by volume 93% sulfuric acid, 12% by volume 32% hydrochloric acid, the balance water). The pickling time is 10 to 20 minutes. The tube is then rinsed with deionized water for 0.5 to 1 minute. The tube is then pickled in aqueous nitric acid, (made by mixing 20% by volume of 68% nitric acid in 80% by volume of water) for 20 minutes. This is followed by rinsing with deionized water for 0.5 to 1 minute and drying. The tube is inspected visually and the pickling steps are repeated if any unusual areas are seen.

The gold tube is prepared by degreasing with an appropriate solvent, followed by acid cleaning with nitric acid (an aqueous solution made 20% by volume of 68% nitric acid in water) for 20 minutes. This is followed by rinsing with deionized water for 0.5 to 1 minute and drying.

The gold lining is swaged onto a mandrel and pulled into the Inconel® tube. The lining is then mechanically expanded by drawing an expansion plug or mandrel through the gold lining. Increasingly larger expansion plugs are dawn through the gold lining until the calculated outer diameter of the gold lining is within the tolerances of the inner diameter of the Inconel® tube. The combined Inconel®-gold structure is referred to as "the tube".

Figure 2:
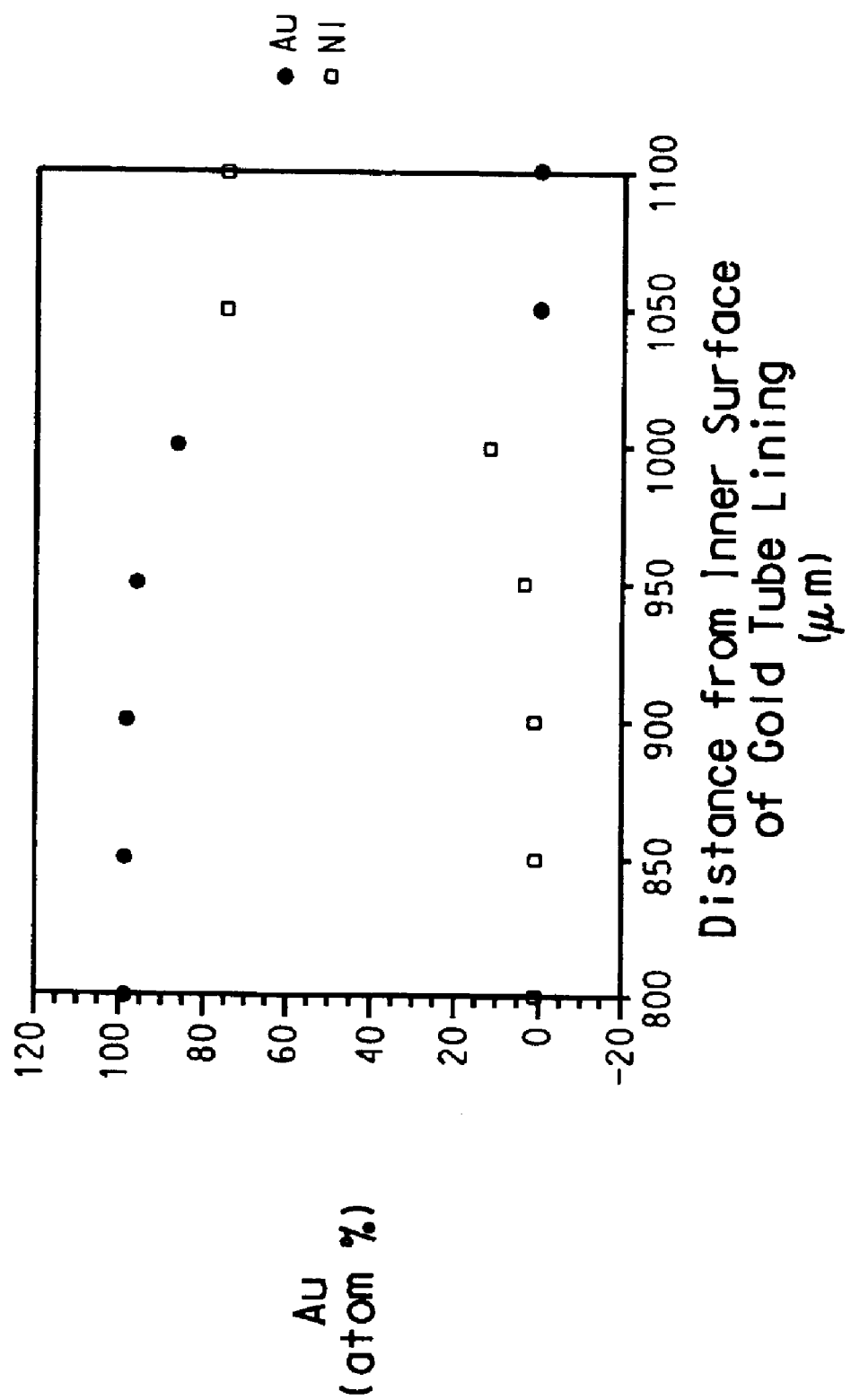
FIG. 2 is a detail of FIG. 1.

The seams between the gold and Inconel® at each end of the tube are sealed using a nickel braze. At intervals along the tube holes are drilled through the Inconel® layer only and fittings are attached to allow the evacuation of the space between the gold layer and the Inconel® layer. The space is evacuated. The tube is then filled with water, and hydrostatic pressure of 20 MPa is applied at room temperature for several hours. The pressure is relieved and the tube drained and dried. The tube is then pressurized with an inert gas such as argon to about 700 kPa and heated to 1050° K to 1150° K for about 8 hours. After cooling and depressurization the tube is tested to determine the extent of bonding (the ultrasonic test does not measure the quality of the bond—it determines whether a bond is present). Ultrasonic testing on this tube indicated that there is bonding on over 99% of the tube surface. Metallographic cross-sections of the tube are prepared and it is confirmed that the gold liner is bonded to the Inconel®. There is no evidence of contamination at the gold-Inconel® interface. Elemental profiles are measured and it is determined that the bond extends over approximately 250 µm in the thickness direction. This is the distance on the graphical representation from the point at which the gold content is first seen to decline from 100 atom % to the point on the graphical representation, FIGS. 1 and 2, at which the gold content is first seen to reach 0 atom %. The distance from the point at which gold content is 90 atom % to the point at which gold content is 10 atom % is 50 µm.

Comparative Example A

The tubes are prepared in the manner described in Example 1 and the tubes are joined as described except that the mechanical expansion step is omitted. The tube is tested using UT and it is determined that no bonding exists between the liner and the supporting metal. This shows that the mechanical expansion step is necessary to achieve metallurgical bonding.

Comparative Example B

The tubes are prepared in the manner described in Example 1 and the tubes are joined as described except that the hydrostatic expansion step is omitted Diffusion bonding is done in two steps: first at 775° K. for 10 hours and then at 1125° K. for 10 hours. Ultrasonic testing is done and reveals that there is limited metallurgical bonding. Bonding exists over approximately 66% of the tube surface. This shows that the hydrostatic expansion step is necessary to achieve complete metallurgical bonding.

Comparative Example C

The tubes are prepared in the manner described in Example 1. In this example mechanical expansion is done as described in Example 1. Instead of continuing as in Example 1, metallurgical bonding is attempted through explosive bonding. The gold liner is coated with explosive charges, which are then detonated. This procedure is repeated until ultrasonic tests indicate a minimum 20% bond around the length and circumference of the Inconel® tube. The tube is then sealed and given a diffusion bonding treatment as described in Example 1. The tube is subsequently given a complete UT inspection and it is found that the extent of bonding is approximately 20%. This shows that explosive bonding is inadequate to achieve complete metallurgical bonding.

Comparative Example D

This example is prepared as in Example 1 except that the tubes are several meters long. Although the procedure of Example 1 is followed, analysis shows little bonding between the layers. Examination of the layers shows that oxide is present on the surfaces. This shows that evacuation of large articles is not complete and enough air remains to oxidize the surfaces and interfere with the formation of a metallurgical bond.

Example 2

This example is prepared as in Example D except that the surface preparation of the tubes is done differently. After cleaning the Inconel® tube, it is immersed in a bath suitable for electroless gold plating and a gold layer of about 0.1 μm thickness is deposited on the surface. Subsequently the tubes are processed as described in Example 1. A metallographic examination shows that metallurgical bonding is well established, without any sign of oxide at the interface. Such oxide would inhibit bonding between the metals. Ultrasonic testing was not done on this tube. The benefit of electroless gold plating is that it protects the Inconel® surface from oxidation during the diffusion bonding step. This is especially important in large tubes where it is difficult to evacuate the annular space efficiently and residual air is likely to remain.

We claim:

1. A process for making a layered article having a curved surface, comprising:
providing a non-planar layer of a wrought supported metal; providing a nonplanar layer of a supporting metal; finishing mating surfaces of said supported and supporting metal layers; aligning the finished mating surfaces of the supported and supporting metal layers; expanding the supported layer mechanically against the supporting layer; expanding the supported layer against the supporting layer by applying hydraulic pressure to the supported layer; applying pneumatic pressure to the supported layer and heating the article to up to 98% of the absolute melting point of the lower melting metal for up to several days; and cooling the article.

2. The process of claim 1 wherein the article is heated to within 50–95% of the absolute melting point of the lower melting metal.

3. The process of claim 1 wherein the article is heated for 1 to 24 hours.

4. The process according to claim 1, further comprising after said finishing step, applying an about 0.1 μm thick layer of oxidation resistant metal to the finished surface of the supported layer or supporting layer, or both.

5. The process according to claim 4, wherein the oxidation resistant metal is gold.

6. The process according to claim 4, wherein the oxidation resistant metal is palladium.

7. The process according to claim 1 wherein the mating surfaces of the supporting and supported layers are finished to a surface roughness of at least about RMS 8.

8. The process according to claim 1 further comprising evacuating a space between the supported and supporting layers.

9. The process according to claim 1 further comprising evacuating a space between the supported and supporting layers, said evacuating being performed between the mechanical expansion step and the hydraulic expansion step.

10. The process according to claim 1 wherein the supporting metal layer is an alloy of nickel and the supported metal layer is gold.

11. The process according to claim 1 wherein the supporting metal layer is an alloy of nickel and the supported metal layer is palladium.

12. The process according to claim 1 wherein the thickness of the interfacial region is less than 150% of the original thickness of the supported metal layer.

13. The process according to claim 1 wherein the thickness of the interfacial region is less than 50% of the original thickness of the supported metal layer.

14. The process according to claim 1 wherein the thickness of the interfacial region is less than 25% of the original thickness of the supported metal layer.

15. A process for making a tube comprising:
providing a tubular outer layer of a supporting metal, and a tubular inner layer of a wrought supported metal; finishing an outer mating surface of the inner layer and an inner mating surface of the outer layer; inserting the inner layer into the outer layer; expanding the inner layer mechanically against the outer layer; expanding the inner layer against the outer layer by applying hydraulic pressure; applying pneumatic pressure to the inner layer and heating the article to up to 98% of the absolute melting point of the lower melting metal for up to several days; and cooling the tube.

16. The process according to claim 15, further comprising after said finishing step, applying an about 0.1 μm thick layer of oxidation resistant metal to the finished surface of either the inner layer or the outer layer, or both.

17. The process according to claim 16, wherein the oxidation resistant metal is gold.

18. The process according to claim 16, wherein the oxidation resistant metal is palladium.

19. The process according to claim 15 wherein the tube is heated to 50 to 95% of the absolute melting point of the lower melting metal.

20. The process according to claim 15 wherein the tube is heated for 1 to 24 hours.

21. The process according to claim 15 wherein the inner mating surface of the supporting layer and the outer mating surface of the supported layer are finished to a surface roughness of at least about RMS 8.

22. The process according to claim 15 further comprising evacuating the space between the supported and supporting layers.

23. The process according to claim 15 further comprising evacuating the space between the supported and supporting layers, said evacuating being performed between the mechanical expansion step and the hydraulic expansion step.

24. The process according to claim 15 wherein the tubular outer layer is an alloy of nickel and the tubular inner layer is gold.

25. The process according to claim 15 wherein the tubular outer layer is an alloy of nickel and the tubular inner layer is palladium.

26. The process according to claim 15 wherein the thickness of the interfacial region is less than 150% of the original thickness of the tubular inner layer of supported metal.

27. The process according to claim 15 wherein the thickness of the interfacial region is less than 50% of the original thickness of the tubular inner layer of supported metal.

28. The process according to claim 15 wherein the thickness of the interfacial region is less than 25% of the original thickness of the tubular inner layer of supported metal.

* * * * *